J. C. SMITH.
PACKLESS ANTIDRIP VALVE.
APPLICATION FILED APR. 10, 1918.

1,278,048.

Patented Sept. 3, 1918.

WITNESSES

INVENTOR
James C. Smith
BY
ATTORNEYS

UNITED STATES PATENT OFFICE.

JAMES C. SMITH, OF PATERSON, NEW JERSEY.

PACKLESS ANTIDRIP-VALVE.

1,278,048.    Specification of Letters Patent.    Patented Sept. 3, 1918.

Application filed April 10, 1918. Serial No. 227,641.

*To all whom it may concern:*

Be it known that I, JAMES C. SMITH, a citizen of the United States, and a resident of Paterson, in the county of Passaic and State of New Jersey, have invented a new and Improved Packless Antidrip-Valve, of which the following is a full, clear, and exact description.

This invention relates to valve mechanisms and particularly to an improved valve which may be quickly opened and closed, and which presents a special structure including a gasket for preventing leaking and thereby dispenses with the usual packing and repacking necessary heretofore in preventing leakage.

Another object in view is the provision of an improved quick acting valve provided with a gasket and associate parts coacting therewith including a spring for always holding the parts in proper position in order to prevent leakage whether the valve is open or closed.

An additional object of the invention is to provide a valve with a rotating operating member and a handle therefor which cannot be depressed to cause leakage while at the same time the parts are held in proper position.

Figure 2:
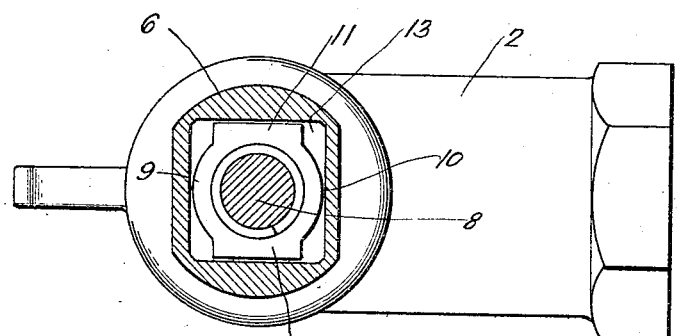
Fig. 2 is a transverse sectional view through Fig. 1 on line 2—2.

Referring to the accompanying drawing by numerals, 1 indicates a casing providing an inlet passage 2 and an outlet passage 3, there being a valve seat 4 between said passageways. The valve seat 4 coacts with the valve member 5 slidingly positioned in the hood or bonnet 6 and adapted to move through part of the casing and engage seat 4 when closed, and to move in the opposite direction away from said seat when opened. The valve member 5 is formed as a sleeve with a closed lower end and internally threaded for part of its length engaging threads 7 on the stem or power shaft 8. The exterior of the valve member 5 at the bottom is formed so as to properly mate with the seat 4 while the upper part is preferably formed with arc-shaped portions 9 and 10 and squared portions 11 and 12 for fitting in the squared socket 13 formed in the lower part of the bonnet 6, as shown particularly in Fig. 2. It is, of course, evident that the upper part could be formed square so as to mate more exactly with the square socket 13 if desired. By making these parts square and by providing the squared portions 11 and 12 the valve member 5 loosely fits in the bonnet, but cannot be rotated though it is allowed a free back and forth movement as the stem or power shaft 8 is rotated. It is also evident that other changes could be made without departing from the invention for preventing the rotation of the valve member 5, as for instance a tongue and groove structure could be used in connection with a round upper part.

Figure 1:
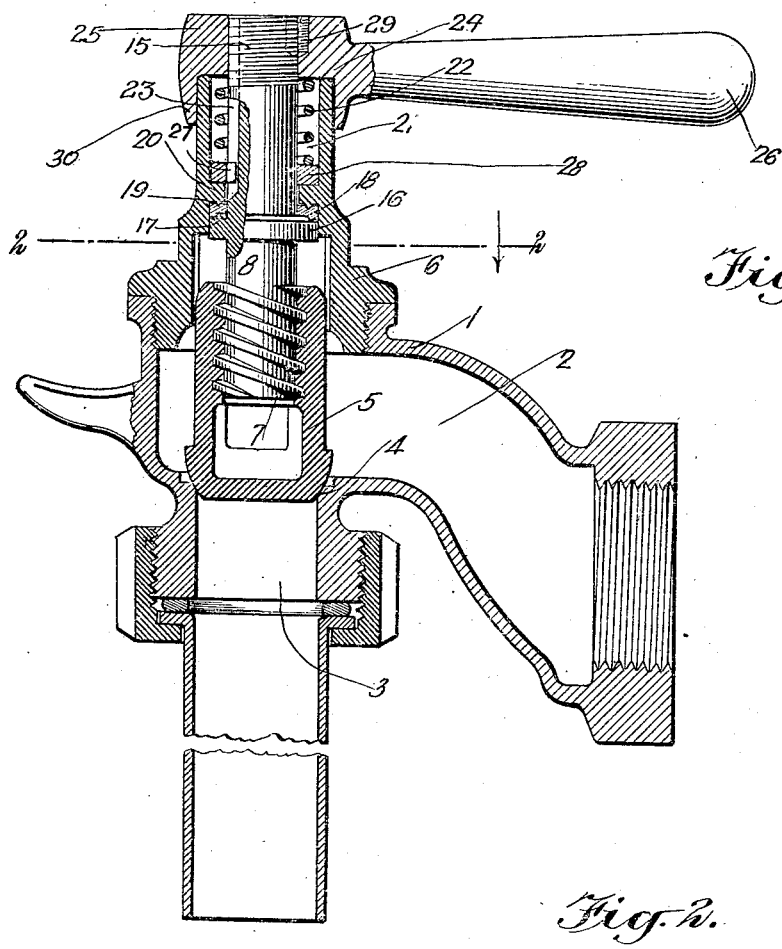
Figure 1 is a longitudinal vertical section through a valve disclosing an embodiment of the invention.

In forming the stem or power shaft 8 the same is provided with preferably large threads 7 at one end and preferably comparatively small threads 15 at the opposite end, while substantially centrally thereof a shouldered member or flange 16 is provided formed with an annular sharpened upstanding bead 17 designed to be pressed into the gasket 18 which may be of any material, as for instance some suitable composition. The gasket 18 is also pressed against the annular sharpened bead 19 projecting from the annular shoulder 20 formed integral with the bonnet 6. The shoulder 20, in addition to acting as means for guiding the shaft 8 and providing the bead 19, acts as a division member for dividing the upper part of the bonnet from the lower part. Above the shoulder 20 a chamber 21 is provided which extends to the outer end of the bonnet, said chamber accommodating a spring 22 which spring acts with one end against the head 24 of the operated member 25, which operating member is supplied with a handle 26 for rotating the head 24. The lower end of spring 22 rests against washer 28, which washer may be any desired material, as for instance brass, and which is preferably provided with a key 27 for fitting into the slot or keyway 23. This structure causes the two surfaces against which the spring 22 rests to rotate in unison whereby the spring will rotate with the rod or shaft 8. If preferred an anti-friction washer could be used at each end of the spring whereby the spring would remain stationary while the other parts would rotate. Head 24 is provided with a threaded bore whereby the same may be screwed on to the threaded section 15 of shaft 8 as shown in Fig. 1 and locked in proper position by the set screw 29. The lower part of the head 24 is provided with an overhanging annular depending flange 30 overlapping the upper part of the bonnet 6 to help hold the head in position and also to give a fixed position to the various parts. In addition, this design also eliminates any possibility of binding or tilting of the stem through any downward or upward thrust on the head 24. By this construction and arrangement spring 22 is provided so as to normally urge the head 24 upwardly with the parts in the position shown in Fig. 1, and the shaft 8 and the flange 16 in such a direction as to press against the gasket 18 whereby leaking is prevented. Preferably the head 24 continually contacts with the upper end of bonnet 6 so that the shaft 8 cannot be moved downwardly in case of pressure on the head 24 while said head may be freely rotated and the valve member 5 opened or closed.

What I claim is:

1. A valve of the character described, comprising a casing, a valve member arranged in the casing, a hood mounted on the casing provided with a chamber in the upper part, an inwardly extending flange at the bottom of said chamber, a shaft for operating said valve member, said shaft having a collar coacting with said flange for producing a continuous tight connection, said shaft having a keyway therein within said chamber, a washer surrounding said shaft positioned in said chamber, said washer having a key projecting in said keyway, an operating member normally resting on said hood for rotating said shaft, a spring resting on said washer and engaging said operating member whereby the spring will rotate with said shaft and will continually urge said collar toward said flange.

2. A valve of the character described comprising a casing, a valve member arranged in the casing a hood on the casing provided with a chamber in the upper part, an inwardly extending flange at the bottom of said chamber, a shaft for operating said valve member, said shaft having a collar coacting with said flange for producing a continuous tight connection, a washer surrounding said shaft positioned in said chamber and resting on said flange, an operating member normally contacting with said hood and engaging said shaft so as to rotate the shaft, a spring resting on said washer and engaging said operating member, and means for causing said washer to rotate with said shaft and the operating member whereby the spring will also rotate with the shaft and at the same time will continually urge said collar toward said flange, said washer being mounted so as to be capable of independent movement longitudinally of the shaft.

JAMES C. SMITH.

Copies of this patent may be obtained for five cents each, by addressing the "Commissioner of Patents, Washington, D. C."